United States Patent

Blake et al.

[11] Patent Number: 5,812,305
[45] Date of Patent: *Sep. 22, 1998

[54] OPTICAL PARAMETRIC OSCILLATOR CAVITY DESIGN

[75] Inventors: Geoffrey A. Blake, Pasadena; Sheng Wu, South Pasadena; David Rodham, Glendale, all of Calif.

[73] Assignee: California Institute of Technology, Pasadena, Calif.

Related U.S. Application Data

[60] Provisional application No. 60/007,869 Dec. 1, 1995, and provisional application No. 60/007,868 Dec. 1, 1995.

[21] Appl. No.: 758,689

[22] Filed: Nov. 27, 1996

[51] Int. Cl.⁶ .................................................. G02F 1/39
[52] U.S. Cl. ............................................. 359/330; 372/21
[58] Field of Search .................... 359/326–332; 372/21–22

[56] References Cited

U.S. PATENT DOCUMENTS

| | | | |
|---|---|---|---|
| 3,628,186 | 12/1971 | Ashkin et al. | 359/330 X |
| 5,047,668 | 9/1991 | Bosenberg | 359/330 |
| 5,079,445 | 1/1992 | Guyer | 359/330 |
| 5,227,911 | 7/1993 | Schiller et al. | 359/328 X |
| 5,276,548 | 1/1994 | Margalith | 359/330 |

*Primary Examiner*—John D. Lee
*Attorney, Agent, or Firm*—Fish & Richardson P.C.

[57] ABSTRACT

An optical parametric oscillator which operates with uncoated optics and a non-linear crystal. The pulse length is long relative to the cavity length, and hence the pump is still operating when the crystal flouresces. The fresnel reflection from the uncoated optics is sufficient to maintain the flourescence. Another aspect attenuates one of the idler and signal beams within the cavity, to allow the other one to emerge more dominant.

14 Claims, 3 Drawing Sheets

OPTICAL PARAMETRIC OSCILLATOR CAVITY DESIGN

STATEMENT AS TO FEDERALLY SPONSORED RESEARCH

The U.S. government may have certain rights in this invention based on ARPA grant number N00014-92-J-1901 awarded by the U.S. Navy

CROSS REFERENCE TO RELATED APPLICATIONS

This application claims priority from provisional applications, numbers 60/007,869, and 60/007,868, both filed Dec. 1, 1995.

TECHNICAL FIELD

The present invention relates to optical parametric oscillators, and more specifically to the cavity of an optical parametric oscillator.

Background

Parametric amplification uses a first kind of radiation to create another kind of radiation different than the input. An optical parametric oscillator is a passive optical device that converts one laser beam, called the pump, into two other laser beams, called the signal and idler beams. The device includes a non-linear medium, typically a crystal, and a cavity which feeds back radiation into the crystal. The output signal and idler beams in general have different wavelengths than the pump. The output beam with the shorter wavelength is conventionally referred to as the signal beam, and the longer wavelength beam is conventionally referred to as the idler beam.

Optical parametric oscillators are well known. Many different relations between the signal and idler beam relative to the pump have been well described. The frequencies and ratio of frequencies between the signal and idler is proportional to the kind of crystal which is used, the angle of incidence of the laser into the crystal, a voltage across the crystal, and/or the temperature of the crystal, among others. Selection of the pump wavelength, non-linear crystal and optical components, especially the cavity, also select the tuning range.

The non-linear medium is typically a non-linear optical crystal of a type well known in the art such as BBO, LBO, KTP or the like. The pump excites the crystal and induces parametric fluorescence. That fluorescence then interacts with the cavity and causes feedback to the crystal. The feedback between the cavity and the crystal amplifies the oscillation, resulting in the two output beams.

Of course, the beams follow the laws of quantum mechanics, so the momentum and photon energy of the pump beam is equal to the sum of the momentums and photon energies of the signal beam and the idler beam.

Applications of optical parametric oscillators often require high power outputs. However, the output energy is often limited by how hard the optical parametric oscillator cavity can be driven. A high intensity from the pump laser source may also be required to efficiently pump the optical parametric oscillator cavity. However, the amount of power that can be supplied to the optical parametric oscillator cavity is limited by the optical damage threshold of the coatings of the various optical components and the materials of the non-linear crystals. Improvements have led to new non-linear crystals such as BBO and LBO, which have damage thresholds that are well above 1 $GW/cm^2$. Even optical parametric oscillators made with these devices, however, remain vulnerable to optical damage. This is especially true when a wide tuning range needs to be covered with a limited set of coatings. The cost of special coatings can also be relatively expensive.

In view of the above problems, the inventors recognized that the coatings on the optical cavity are often one limiting point on the application of the optical parametric oscillator. The present invention describes techniques which obviate these problems by improving the operation of the cavity.

A first objective of the present invention is to use an parametric oscillator which does not coat at least certain cavity components. This is based on a new understanding of a particular mode in which such oscillators can operate. According to this aspect of the invention, the optical coatings in certain areas are removed or minimized.

A second embodiment of the invention uses conventional coated input and output coupling mirrors and a special cavity that improves certain efficiencies of the oscillator.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

Figure 1:
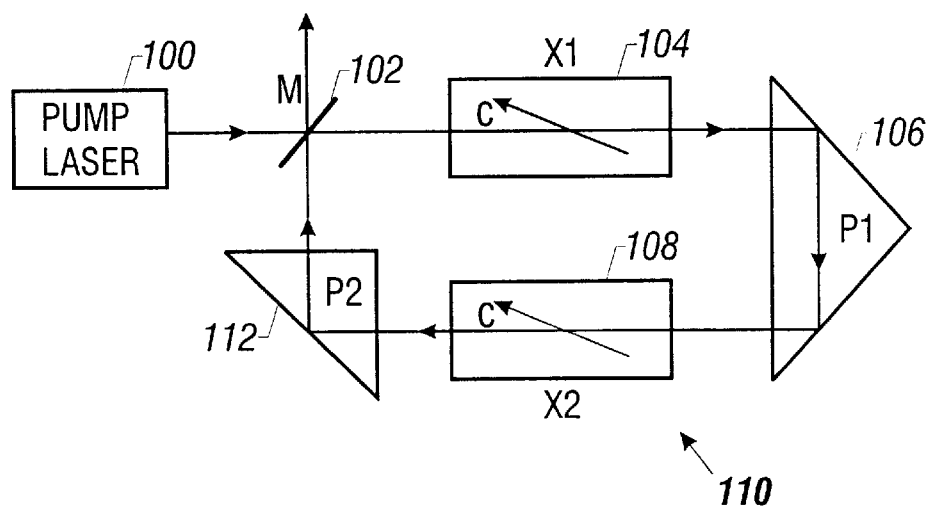
FIG. 1 shows a first embodiment of the invention which uses uncoated or minimally coated cavity components.

The basic structure of the optical parametric oscillator according to the first embodiment is shown in FIG. 1. Pump laser 100 provides a beam to uncoated mirror 102 which passes the beam into the ring-shaped cavity 110.[1] The pump beam excites the first crystal 104 and its output is sent to a retro-reflecting prism 106 and to a second crystal 108. The beam is reflected out of the cavity 110 by prism 112 through uncoated mirror 102.

[1] other shapes 102 is an uncoated mirror and hence the only reflection from the uncoated mirror is the Fresnel reflection which occurs at the air/mirror material interface of mirror 102. This Fresnel reflection is usually only a few percent. However, the inventors found a special arrangement where this small amount of reflection from the uncoated mirror provides sufficient feedback to start the parametric oscillation process.

As well known in the art, the polarization of the pump, the signal, and the idler are usually arranged in a fashion that uses inherent properties of the cavity. For example, an optical parametric oscillator with BBO crystals being used as the non-linear material pumped at 355 nanometers using phase 1 phase-matching is preferred. This technique arranges the polarization of the pump to be in the P direction when it hits the mirror M102. This only provides around 2% reflection loss for the pump: 1% at each face.

The polarizations of the resultant signal and idler will be in the S direction when they arrive at mirror M102. One side of the mirror M102 will reflect around ten percent of the signal and the idler. This is sufficient to start the parametric oscillation.

This embodiment describes use with two non-linear crystals 104 and 108. These can be located in the cavity side by side with their crystal axis pointing in the same direction, and are preferably rotated together on a single axis to change the reflection characteristics. The ring cavity configuration shown in FIG. 1 automatically compensates for walk-off and non-linear crystals. This is described, for example, in U.S. Pat. Nos. 5,047,668 and 5,079,445, the disclosures of which are herein incorporated by reference.

The inventors found that past designs can have efficiencies as high as 60 to 70 percent. However, the output power of these designs is limited by the limited pumping energy that could be injected into the cavity before reaching the damage threshold of the optics. The inventors realized that this damage threshold was mostly based on the coatings in the cavity.

This embodiment has been based on the recognition that the optical parametric oscillator can be operated with a small fluorescence reflection: and that the amount of fluorescence reflection can be as small as 4–10% in proper circumstances. This 4 to 10 percent reflection which can be obtained from a system which has no coating or minimal coating. In contrast, prior art systems used a coating which reflected 20 to 80 percent.

One of the important parts of the present invention is the recognition that the fluorescence of the crystal can be reinforced due to a feedback radiation portion that is at a much lower level than before. This operation is most efficient when certain parameters of the oscillator are maintained. Specifically, the preferred embodiment defines that the cavity is short as compared with the pulse length. A preferred lower limit for the optical parametric oscillators designed by the inventors is that the pulse length needs to be at least two times as long as the cavity. Even more preferred, however, is that the pulse length is an order of magnitude greater than the cavity length. This means that the circulation is still occurring within the cavity while the pump is on.

Preferred values include a 15 foot pulse from the laser with 15 cm of optical path length. A short optical path is also preferred according to the present invention.

An important part of the present embodiment is its ability to compensate for certain changes. Past optical parametric oscillator designs were limited in that one cavity typically optimized for a single pump source. Changing the pump source significantly, therefore, required changing some aspect of the optics inside the cavity. The ring cavity design of the present invention uses a cavity where at least part of the cavity does not require optical coatings. The present invention preferably uses a technique where none of the optics are coated. Un-coated optics allows changing the pump source and the crystals without changing the cavity itself.

Another problem that the inventors noticed with coatings was the tendency of the coating to modulate the output energy based on the reflectivity of the coatings. This tended to cause ringing of the output energy throughout the coated wavelength region.

However, it is also possible to modulate some of the optics with coatings. For example, one side of the mirror 102 could be covered with anti-reflective coating at the pump side. Importantly, this could reduce the loss of the pump to one percent. Broadband anti-reflection coatings could also be used at the signal and pump region on the prisms to reduce the loss on the signal wave.

The above-described first embodiment sacrifices a certain amount of efficiency for the ability to provide an extremely high power optical parametric oscillator. However, it is also sometimes desirable to provide a high efficiency oscillator. These special designs described herein are usable either on their on or in conjunction with the first embodiment.

Figure 2:
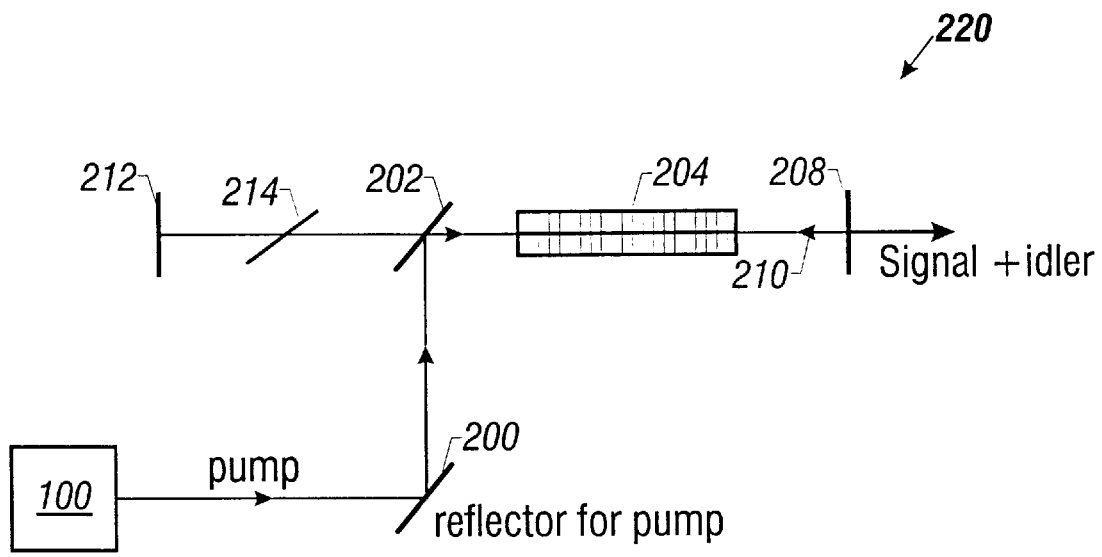
FIG. 2 shows another embodiment with a linear cavity having a long pass filter in the cavity that reinforces the idler wave.

FIG. 2 shows a first embodiment which uses a linear cavity. The linear cavity 220 includes a plano reflector with a metallic high reflectivity coating as rear mirror 212, optically in series with long pass filter 214. Plano reflector 202 acts as the pump input coupler mirror. Reflector 202 is highly reflective of the pump frequencies and at the 45° input incidence angle. The optical energy is hence coupled into the linear cavity through the pump input coupler mirror 202. However, the mirror is much less reflective for the signal and idler directions and/or frequencies, allowing those beams to pass.

Output coupling mirror 208 forms the output of the oscillator.

The linear cavity 220 extends between rear mirror 212 and output mirror 208. Various components can be placed within cavity 220 to tune its operation. For example, a long pass filter can be used as described with reference to FIGS. 2–4. Long pass filter 214 has a cut-off that lies near the degenerate point of the Optical parametric oscillator.

Non-linear optical crystal 204 is located between the input mirror 202 and the output mirror 208. A certain amount of the optical energy is reflected back from the output mirror 208 to form the feedback shown as 210. These mirrors are highly reflective at the pump wavelength, but only very lightly reflective in the signal and idler regions. Hence, these mirrors have little effect on the signal and idler beams.

The crystal in this embodiment can be formed of any desired material such as BBO, KTP, LBO, $KbNbO_3$, or $AgGaSe_2$.

This Optical parametric oscillator technique operates by coupling the pump beam into the linear cavity formed between rear mirror 212 and output mirror 208. The pump beam then passes through the non-linear crystal 204 and is retro-reflected by the output coupling mirror 208. The signal and idler that are generated in the non-linear crystal then resonate bi-directionally in cavity 220. Long pass filter 214 absorbs some percentage of the signal beam to reinforce a single resonating wave —here the idler wave. A particularly preferred embodiment absorbs close to 100% of the signal beam and hence maintains only the idler wave.

An important part of using this filter is to minimize possible damage to the metallic coating. When the signal wave of the Optical parametric oscillator lies in its visible range, the energy can damage the metallic coating on the mirrors, and more specifically rear mirror number 212. However, the long wave pass filter can minimize the visible photons which reach the metallic coating and therefore prevents damage. Second, there are times when the desired output of the optical parametric oscillator is one of the components but not the other. Attenuating one of the beams minimizes the optical energy which resonates in the cavity. When the cavity is resonating on the idler wave, the bandwidth of the Optical parametric oscillator is narrowed. This also reduces divergence of the Optical parametric oscillator output.

The techniques of this embodiment maintain the merits of past Optical parametric oscillator designs, while using industry standard Nd:Yag coatings in the cavity. These standard coatings are much cheaper than the special coatings which have been previously suggested. The use of the materials herein avoids these coatings being damaged even by high operating parameters. Moreover, based on the inventors' understanding, even the smallest feedback, e.g., 4 to 10 percent, is sufficient to start the parametric process in the Optical parametric oscillator cavity.

The preferred operation uses 355 nm pump radiation and a BBO crystal 204.

Figure 3:
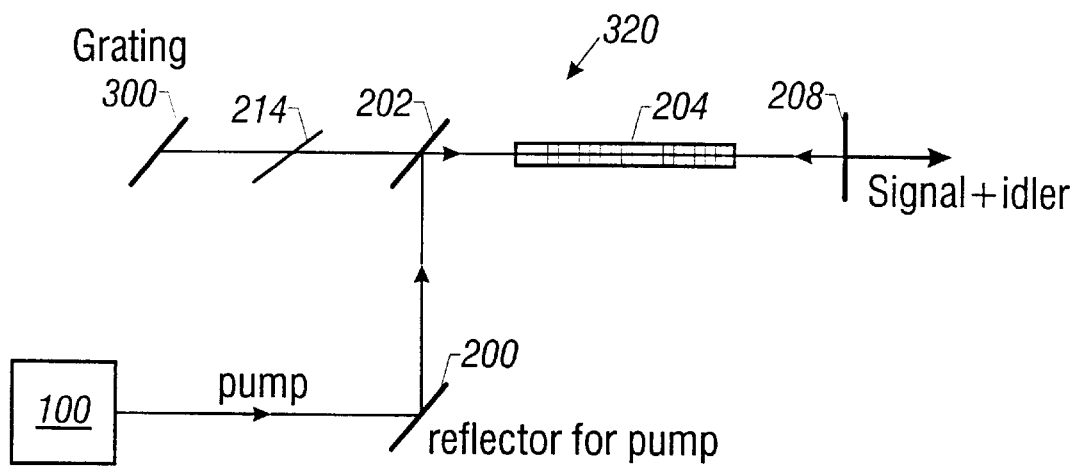
FIG. 3 shows an embodiment with a grating in the cavity.

FIG. 3 shows a higher spectral resolution embodiment. This embodiment replaces the rear metallic mirror 212 with a grating 300 placed in a so-called Littrow configuration. This grating serves to reflect the idler back into the linear cavity 320. The grating 300 further narrows the bandwidth of the output.

Figure 4:
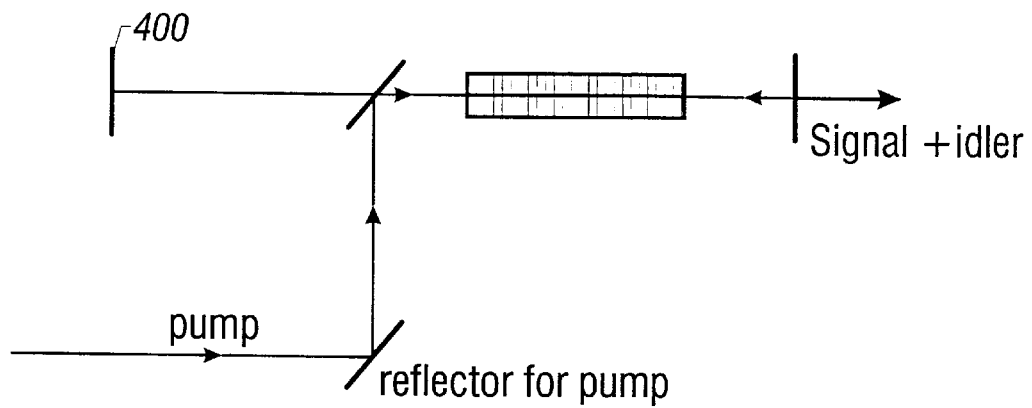
FIG. 4 shows an embodiment with a dielectric coated mirror.

FIG. 4 shows yet another embodiment in which both the rear mirror and the filter are replaced by a single dielectric coated mirror 400 with desired passband characteristics. An example of such a mirror is a high reflector working in the visible region, e.g., the BBD1 mirror availible CVI Laser Corporation. This mirror provides a lower parametric threshold and enables very high efficiency. Up to 65% efficiency at 145 mJ pump level is expected.

Figure 5:
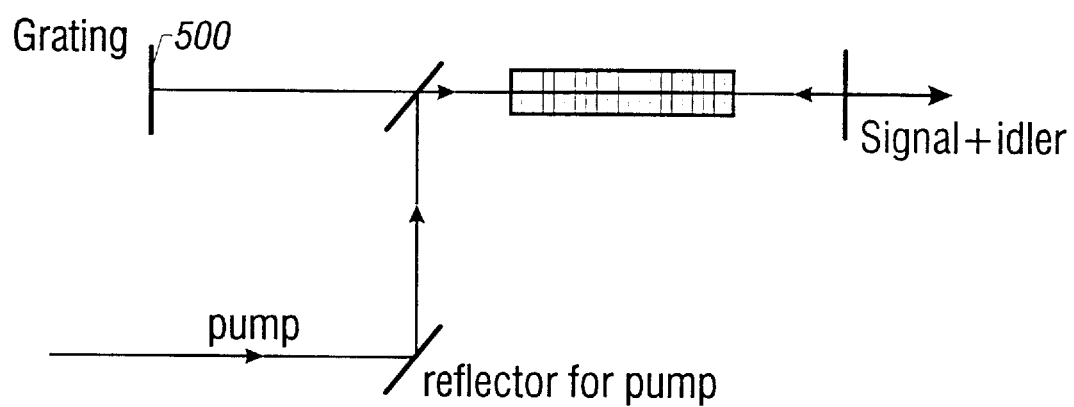
FIG. 5 shows another grating embodiment.

FIG. 5 shows yet another embodiment in which the rear mirror is replaced by a single grating 500. This avoids losses from the long wave pass filter, but loses some of the advantages of that long wave pass filter.

An important part of the embodiments of FIGS. 2–5 is that each of these can be easily adapted for different pump sources and non-linear crystals. For example, the FIG. 2 embodiment allows a different crystal to be accommodated by changing only mirrors 202 and 208.

Although only a few embodiments have been described in detail above, those having ordinary skill in the art will certainly understand that many modifications are possible in the preferred embodiment without departing from the teachings thereof.

For example, attenuation of either the signal or idler beams could be effected. The crystals could be located in different places than those that are described herein. Moreover, the optical parametric oscillator could be of a different configuration than those described herein.

All such modifications are intended to be encompassed within the following claims.

What is claimed is:

1. An optical parametric oscillator, comprising:
   a pump laser, providing a laser output having first characteristics;
   an optical cavity, positioned in a location to receive said laser output from said pump laser;
   a tuning element, within said optical cavity;
   a non-linear medium, provided in said cavity and receiving said laser output and producing a response to said laser output, said response having different characteristics than said first characteristics;
   said optical cavity having an uncoated reflection surface which reflects only a small portion of incident radiation to form a feedback radiation portion, said feedback radiation portion forming optical feedback to cause and reinforce said response in said non-linear medium; wherein said pump laser produces a pulse length that maintains circulation in said cavity while said pump is still operating, and wherein the cavity is short as compared with the pulse length.

2. An oscillator as in claim 1, wherein said medium is a non-linear crystal.

3. An oscillator as in claim 1 wherein the pulse length is at least two times as long as the cavity length.

4. An oscillator as in claim 1 wherein the pulse length is an order of magnitude greater than the cavity length.

5. An optical parametric oscillator, comprising:
   a pump, providing a radiation output having first characteristics;
   an optical cavity, positioned in a location to receive said radiation output from said pump;
   a non-linear medium, provided in said cavity and receiving said radiation output and producing a response to said radiation output, said response having different characteristics than said first characteristics; and
   said optical cavity having a reflection surface which reflects a portion of incident radiation back to said non-linear medium to form a feedback radiation portion which maintains parametric oscillation, said reflection surface reflecting between 2 and 10% of incident radiation.

6. An oscillator as in claim 5, wherein said reflection surface is uncoated with any reflection-increasing material.

7. An oscillator as in claim 6, wherein said feedback radiation portion forming optical feedback to cause and reinforce said response in said non-linear medium.

8. An oscillator as in claim 5 wherein said pump produces radiation having a specified pulse length wherein a length of the cavity is short as compared with the pulse length.

9. An oscillator as in claim 8 wherein said pulse length is at least two times as long as the cavity length.

10. An oscillator as in claim 8 wherein said pulse length is an order of magnitude greater than the cavity length.

11. An optical parametric oscillator, comprising:
    a laser pump, producing a pump beam;
    a non-linear medium, receiving the pump beam, and producing a signal beam and an idler beam, both different than the pump beam;
    a cavity, propagating at least the signal and the idler beam; and
    a filter, located in the cavity, and which at least partially absorbs one of said signal or idler beams to maintain dominance of the other beam, wherein said pump produces a pump beam having a pulse length and wherein a length of the cavity is short as compared with the pulse length.

12. An oscillator as in claim 11 wherein said pulse length is at least twice as long as the cavity length.

13. An oscillator as in claim 11 wherein said pulse length is at least an order of magnitude greater than the cavity length.

14. An oscillator as in claim 11, further comprising a tuning element, within said cavity.

* * * * *